United States Patent [19]

Ohmori et al.

[11] 4,285,042
[45] Aug. 18, 1981

[54] ANTISKID BRAKE DEVICE

[75] Inventors: Taiji Ohmori, Kawagoe; Makoto Sato, Kamifukuoka, both of Japan

[73] Assignee: Honda Giken Kogyo Kabushiki Kaisha, Tokyo, Japan

[21] Appl. No.: 56,696

[22] Filed: Jul. 11, 1979

[30] Foreign Application Priority Data

Jul. 21, 1978 [JP] Japan .................................. 53-89265

[51] Int. Cl.³ ................................................ B60T 8/10
[52] U.S. Cl. ...................................... 364/426; 303/95; 303/109
[58] Field of Search ..................... 364/426; 303/93–95, 303/109, 100, 106

[56] References Cited

U.S. PATENT DOCUMENTS

| | | | |
|---|---|---|---|
| 3,658,388 | 4/1972 | Hasegawa | 303/109 |
| 3,674,318 | 7/1972 | Hickner et al. | 303/100 |
| 3,832,010 | 8/1974 | Grosseau | 303/95 |
| 3,913,680 | 10/1975 | Carlson | 303/109 |
| 3,985,400 | 10/1976 | Iizuka et al. | 303/95 |
| 4,084,859 | 4/1978 | Bull et al. | 303/106 |
| 4,094,556 | 6/1978 | Okamoto et al. | 303/109 |

Primary Examiner—Errol A. Krass
Attorney, Agent, or Firm—Haseltine and Lake

[57] ABSTRACT

An antiskid brake device comprising a reference wheel speed signal setting device for setting the slip rate of the wheel so as to have a relatively small value when the value of the vehicle speed signal is large and to have a relatively large value when the value of the vehicle speed signal is small, the thus set slip rate of the wheel being added to the vehicle speed signal thereby setting the reference wheel speed signal. The reference wheel speed signal setting device comprises an input section for receiving the vehicle speed signal, a logical operation section for setting such slip rate of the wheel and adding the slip rate to the vehicle speed signal for determination of the reference wheel speed signal, and an output section for delivering the reference wheel speed signal. The operational section comprises an operational amplifier, division circuits including resistors, and gain control circuits including resistors and a diode.

7 Claims, 5 Drawing Figures

ANTISKID BRAKE DEVICE

FIELD OF THE INVENTION

The present invention relates to an antiskid brake device in which, in producing a reference wheel speed signal by addition of the slip rate of the wheel to a vehicle speed signal representative of the vehicle speed, the slip rate of the wheel is added to the vehicle speed signal after the slip rate has been established so that the slip rate may have a relatively small value when the value of the vehicle speed signal is large whereas it may have a relatively large value when the value of the vehicle speed signal is small.

DESCRIPTION OF THE PRIOR ART

In a vehicle provided with an antiskid brake device, when the wheel is subjected to a sudden braking force, the wheel speed abruptly reduces which introduces the danger of locking the wheel. Upon occurrence of a danger of locking the wheel, the antiskid device is actuated to release the braking force applied to the wheel. When the braking force is released, the wheel begins to increase its speed. When the wheel speed is restored to a degree that the wheel will not be locked any longer, the braking force releasing action of the antiskid device stops so that the wheel is again subjected to the braking force and as a consequence, the wheel speed again abruptly reduces. Thereafter, such operation is repeatedly effected whereby the wheel speed undergoes a series of periodic variations based on the action of the antiskid brake device while the vehicle speed is reduced.

This antiskid device is designed so as to receive as one of its input parameters, a reference wheel speed signal established by adding the predetermined slip rate of the wheel to the vehicle speed signal representative of the vehicle speed, and at the time of braking, to compare the wheel speed signal representative of the wheel speed with the reference wheel speed signal to control the braking force of the wheel according to the results of the comparison.

The slip rate of the wheel may be defined as the difference between the vehicle speed and the peripheral speed of the wheel divided by the vehicle speed, as given by $$\lambda = (U - Uwi)/U$$

where U is the vehicle speed, Uwi the peripheral speed of the wheel, and $\lambda$ the slip rate of the wheel, it being known that the best braking efficiency may be obtained when the slip rate $\lambda$ is from about 15 to about 25%. In the past, thus, the slip rate of the wheel is first preset to a given value within the range from about 15 to about 25% and the slip rate thus set to a given value is then added to the vehicle speed signal to establish the reference wheel speed signal. Alternatively, as disclosed in Japanese Patent Publication No. 3868/1976, the reference slip rate as a reference point at which the braking force releasing mechanism starts to operate is preset so that the higher the vehicle speed, the greater will be the reference slip rate, and the lower the vehicle speed, the smaller will be the slip rate, in consideration of the delayed actuation characteristic of the braking force releasing mechanism in order that the slip rate of the wheel may be maintained substantially at a given value within the range from about 15 to 25% at all times, when the antiskid device is actually operated.

Incidentally, in the event the wheel speed is obtained as a wheel speed signal in the form of an analog signal, the wheel speed signal contains various signal noises resulting from irregular road surfaces, operation processing of signals, and the like and the waveforms of the wheel speed signals at braking include waveforms of relatively large amplitude as a result of action of the antiskid brake device and also fine-oscillating waveforms of relatively small amplitude. In comparing the wheel speed signal with the reference wheel speed signal for operational processing, the signal noises in the form of a fine-oscillating waveforms of relatively small amplitude may be disregarded when the vehicle speed is high but may adversely affect the antiskid control to a degree that cannot be disregarded, consequently giving rise to erroneous operation of the antiskid device, adversely affecting the feel in operation of the control device at the braking, and decreasing the braking efficiency principally for the reasons given below.

1. When the vehicle speed is high, the rotational motion of the wheels remains relatively stabilized giving rise to less fine variation in the rotation of the wheels due to irregular road surfaces, whereas when the vehicle speed is reduced, the rotational motion of the wheels tends to be finevaried due to irregular road surfaces and in converting the wheel speed signal from a pulse signal into an analog signal, a residual ripple becomes large in view of the filter characteristic as the frequency of pulse signal decreases, and 2. When the vehicle speed is high at the initial stage of the braking operation, there is a large difference between the value of the vehicle speed signal and the value of the reference wheel speed signal, and the rate of amplitude of the waveform of the wheel speed signal due to the signal noise to the amplitude of the waveform of the wheel speed signal based on the action of the antiskid brake device is relatively small, whereas, when the vehicle speed reduces at the later stage of the braking operation, the difference between the value of the vehicle speed signal and the value of the reference wheel speed signal is reduced and the amplitude of the waveform of the wheel speed signal based on the action of the antiskid brake device becomes small so that the rate of the amplitude of waveform due to signal noise to the amplitude of the waveform just mentioned above becomes relatively large.

SUMMARY OF THE INVENTION

It is a primary object of the present invention to provide an antiskid brake device which even if signal noise is contained in the wheel speed signal, does not give rise to erronous operation of the antiskid device and does not adversely affect the operator's feel in operation of the control device at braking, while minimizing the reduction of the braking efficiency within a satisfactorily small range.

The invention will best be understood by reference to the following description taken in connection with the accompanying drawings.

DESCRIPTION OF THE PREFERRED EMBODIMENTS

Figure 1:
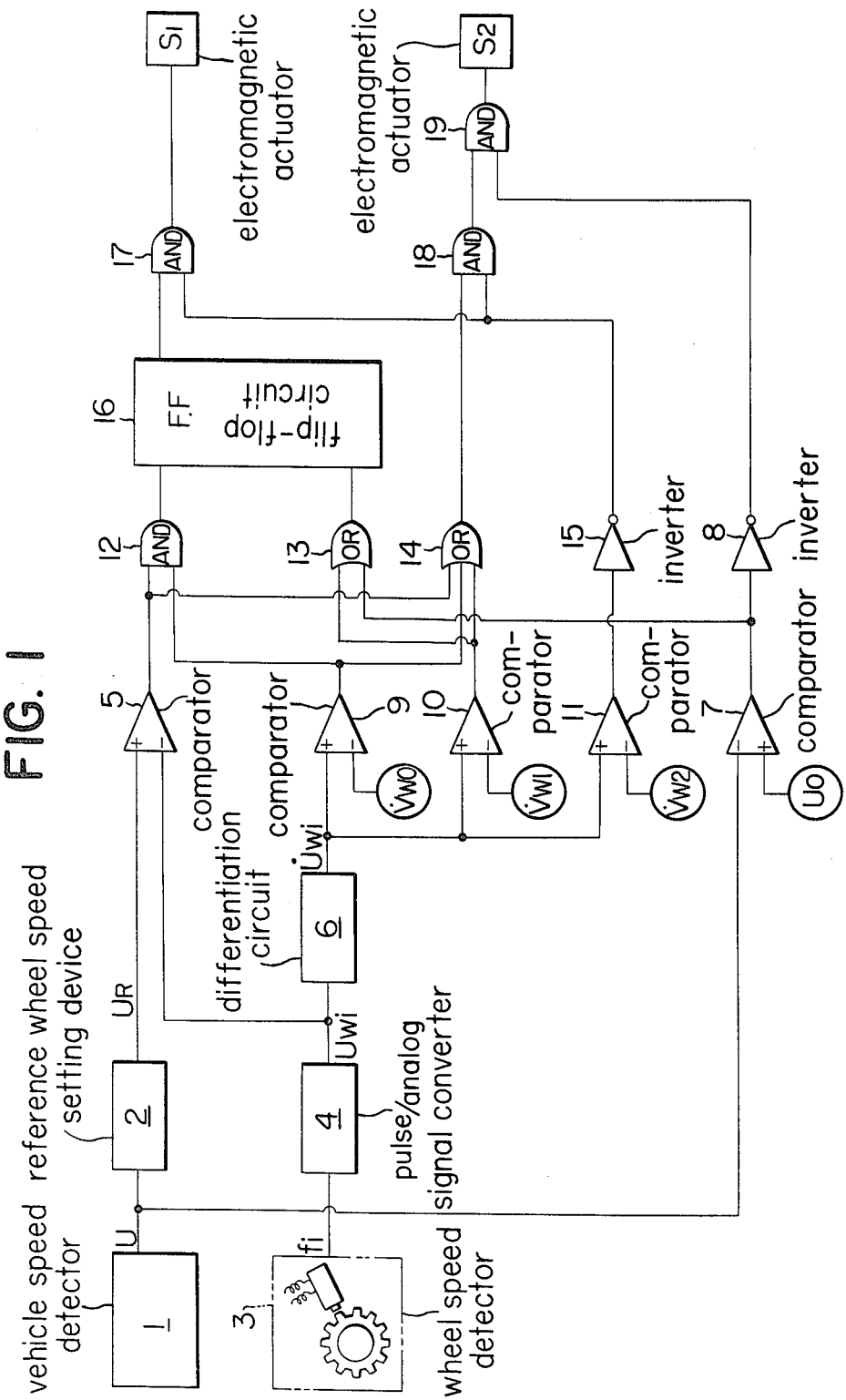
FIG. 1 is a circuit diagram of a control circuit for feeding control signals to a braking force releasing electromagnetic actuator in an antiskid brake device.

Referring first to FIG. 1 there is shown one embodiment of a control circuit for feeding control signals to a braking force releasing electromagnetic actuator. The vehicle speed signal U detected by a vehicle speed detector 1, by which ground speed of the vehicle is estimated or detected in a suitable manner, is fed to a reference wheel speed signal setting device 2 as well as a comparator 7. A reference wheel speed signal setting device 2 includes an input section for receiving the vehicle speed signal U as an input signal, an operation section for setting the slip rate $\lambda$ of the wheel, which is to have a relatively small value when the value of the vehicle speed signal U is large while having a relatively large value when the vehicle speed signal U is small and adding the thus set slip rate $\lambda$ of the wheel to the vehicle speed signal U, and an output section for delivering the vehicle speed signal U with the slip rate $\lambda$ of the wheel added thereto as a reference wheel speed signal $U_R$. The reference wheel speed signal $U_R$ is established so as to be given by the formula $$U_R = (1 - \lambda) U$$

and this signal is fed, as an output signal, to the comparator 5.

The peripheral speed of the wheel forming the subject of controlling the braking force is detected by a wheel speed detector 3 attached to the wheel. The wheel speed detector 3 produces, as its output signal, a frequency signal fi of a value proportional to the speed of the wheel relative to vehicle body, the signal fi being immediately converted into a wheel speed signal Uwi of a value proportional to the wheel speed, as an analog signal, by a pulse/analog signal convertor 4 which converts the pulse signal into the analog signal.

The wheel speed signal Uwi is successively fed to the comparator 5 and a differentiating circuit 6. The differentiating circuit 6 differentiates the wheel speed signal Uwi to produce a wheel acceleration signal $\overset{\circ}{U}wi$ as an output signal. The wheel acceleration signal $\overset{\circ}{U}wi$ is fed to comparators 9, 10 and 11.

The comparator 5 is designed so that the wheel speed signal Uwi is compared with the reference wheel speed signal $U_R$, and only when the value of the wheel speed signal Uwi is smaller than the value of the reference wheel speed signal $U_R$, an output signal is provided, which output signal is fed to AND circuit 12 and OR circuit 14. The comparator 9 is designed so that the wheel acceleration signal $\overset{\circ}{U}wi$ is compared with a reference wheel deceleration signal $-\overset{\circ}{V}wo$ representative of a preset negative reference acceleration, and only when the value of the wheel acceleration speed $\overset{\circ}{U}wi$ is smaller than the value of the reference wheel deceleration signal $-\overset{\circ}{V}wo$, an output signal is provided, which output signal is fed to AND circuit 12 and OR circuit 14. The comparator 10 is designed so that the wheel acceleration signal $\overset{\circ}{U}wi$ is compared with the first reference wheel acceleration signal $\overset{\circ}{V}wi$, and only when the value of the wheel acceleration signal $\overset{\circ}{U}wi$ is larger than the value of the first reference wheel acceleration signal $\overset{\circ}{V}wi$, an output signal is provided, which output signal is fed to OR circuit 13 and OR circuit 14. The comparator 11 is designed so that the wheel acceleration signal $\overset{\circ}{U}wi$ is compared with a preset second reference wheel acceleration signal $\overset{\circ}{V}w2$ having a value larger than that of the first reference wheel acceleration signal $\overset{\circ}{V}wi$, and only when the value of the wheel acceleration signal $\overset{\circ}{U}wi$ is larger than the value of the second reference wheel acceleration signal $\overset{\circ}{V}w2$, an output signal is provided, which output signal is fed to inverter 15. Further, a comparator 7 is designed so that the vehicle speed signal U is compared with a preset low reference vehicle speed signal Uo, and only when the value of the vehicle speed signal U is smaller than the value of the low reference vehicle speed signal Uo, an output signal is provided, which output signal is fed to OR circuit 13 and invertor 8.

The output signal of the AND circuit 12 and the output signal of the OR circuit 13 are respectively fed to a flip-flop circuit 16, and the output signal of the flip-flop circuit 16 is in turn fed to an AND circuit 17. The output signal of the OR circuit 14 is fed to an AND circuit 18, and the output signal of the inverter 15 is fed to AND circuit 17 and AND circuit 18. The output signal of the inverter 8 is fed to an AND circuit 19. The output signal of the AND circuit 17 is fed to a first electromagnetic actuator S1, and the output signal of the AND circuit 19 is fed to a second electromagnetic actuator S2.

The operation of the first and second electromagnetic actuators S1 and S2 is as follows. When a signal is not fed to the first and second electromagnetic actuators S1 and S2, each of the electromagnetic actuators S1 and S2 will not act on the braking device, and the braking device freely increases its braking force applied to the associated wheel according to a brake operating input induced by an operator. When a signal is not fed to the first electromagnetic actuator S1 but a signal is fed to the second electromagnetic actuator S2, each of the electromagnetic actuators S1 and S2 acts on the braking device in a manner such that the braking force is maintained constant so that even if the brake operating input should be increased, the braking force will not be increased accordingly. Further, when a signal is fed to both the first and second electromagnetic actuators S1 and S2, each of the electromagnetic actuators S1 and S2 acts on the braking device so that the braking force is decreased irrespective of the brake operating input.

The low reference vehicle speed signal Uo is representative of a signal corresponding to the threshold value of the vehicle speed which is so low as not to require the antiskid action. Accordingly, when the value of the vehicle speed signal U is smaller than the value of the low reference vehicle speed signal Uo, the comparator 7 produces an output signal, but this output signal is inverted by the inverter 8 in the course of being fed to the AND circuit 19 so that when the value of the vehicle speed signal U is smaller than the value of the low reference vehicle speed signal Uo, no signal is fed to the second electromagnetic actuator S2. That is, at this time, the braking force may increase freely according to the brake operating input.

On the other hand, when the value of the vehicle speed signal U is larger than the value of the low reference vehicle speed signal Uo, the comparator 7 will not produce an output signal, and an output signal is fed from the inverter 8 to the AND circuit 19.

It is now assumed that the braking force is applied to the wheel in a state where the value of the vehicle speed signal U is larger than the value of the low reference vehicle speed signal Uo. Since the wheels begin to decelerate at the same time the braking force is applied thereto, at least the comparators 10 and 11 will not then produce an output signal and an output signal of the inverter 15 is fed to the AND circuits 17 and 18. Then, when the value of the wheel speed signal Uwi is smaller than the value of the reference wheel speed signal $U_R$ and the value of the wheel acceleration signal $\mathring{U}wi$ is smaller than the value of the reference wheel deceleration signal $-\mathring{V}wo$, the comparator 5 produces an output signal and the comparator 9 produces an output signal, and as a result, the AND circuit 12 produces an output signal to allow the flip-flop circuit 16 to begin producing an output signal. The flip-flop circuit 16 keeps producing the output signals until a fresh input signal is introduced, and while the flip-flop circuit 16 is producing the output signals, each of the AND circuits 17, 18 and 19 continues to produce an output signal whereby a signal is fed to the electromagnetic actuators S1 and S2, and the braking force decreases irrespective of the brake operating input as the danger of locking the wheel occurs.

As the braking force decreases, the wheels gradually increase in speed, and the value of the wheel acceleration signal Uwi exceeds the value of the reference wheel deceleration signal $-\mathring{V}wo$ and finally exceeds the value of the first reference wheel acceleration signal $\mathring{V}w1$. At this time, the comparator 10 produces an output signal to feed it to the OR circuits 13 and 14 whereas the flip-flop circuit 16 stops generation of output signals heretofore produced by the input signal from the OR circuit 13. If the value of the vehicle speed signal U becomes smaller than the value of the low reference vehicle speed signal Uo during that period, the comparator 7 produces an output signal so that the OR circuit 13 produces an output signal and the flip-flop circuit 16 in turn receives the output signal from the OR circuit 13 to stop generation of the output signal thereof. At this time, neither of the AND circuits 17 and 19 produces an output signal so that no signal is fed to the electromagnetic actuators S1 and S2.

When the flip-flop circuit 16 stops generating an output signal according to the output signal of the comparator 10 in a state where the value of the vehicle speed signal U remains greater than the value of the low reference vehicle speed signal Uo, the AND circuit 17 will not produce the output signal and no signal is fed to the first electromagnetic actuator S1. At this time, a signal is fed to the second electromagnetic actuator S2, but the period of reducing the braking force terminates at this moment.

When the value of the wheel acceleration signal $\mathring{U}wi$ is further increased to exceed the value of the second reference wheel acceleration signal $\mathring{V}w2$, the comparator 11 produces an output signal, and this output signal is inverted by the invertor 15 whereby the AND circuits 17 and 18 stop generating output signals. As a consequence, no signal is fed to the electromagnetic actuators S1 and S2 so that the braking force freely increases according to the brake operating input.

Figure 2:
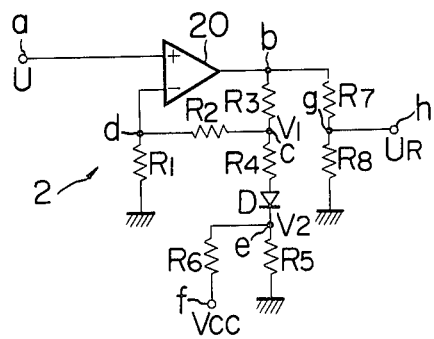
FIG. 2 is a circuit diagram showing a preferred embodiment of a device for setting a reference wheel speed signal in accordance with the present invention.

Turning now to FIG. 2 therein is shown a preferred embodiment of the reference wheel speed signal setting device 2. An output signal of an operational amplifier 20, which receives the vehicle speed signal U as an input signal from an input terminal a, is fed to an output terminal h through a connection b, a resistor R7, and a connection g grounded through a resistor R8. The signal at the connection b is fed back to the input of the operational amplifier 20 through a resistor R3, a connection c, a resistor R2, and a connection d grounded through a resistor R1. The connection c is grounded through a resistor R4, a diode D, a connection e and a resistor R5, and a set-up voltage applying terminal f for applying the set-up voltage Vcc is connected to the connection e through a resistor R6.

In FIG. 2, voltage V2 at the connection e may be represented by V2=Vcc R5/(R5+R6). If V1 represents the voltage at the connection c, then the diode D is in a cut off state if V1 is smaller than V2 (V1<V2). At this time, let G represent the gain of the operational amplifier 20. Then the gain is given by G=1+(R2+R3)/R1. Further, if V1 is larger than V2(V1>V2), the diode D is in conduction state, and since a combined-resistor composed of resistors R4, R5 and R6 is connected to the connection c, the voltage at the connection c drops, as a consequence of which the gain of the operational amplifier increases. If G' represents the gain at that time, the relationship G<G' is obtained. That is, the gain of the operational amplifier 20 automatically changes in a manner such that the gain decreases when the voltage of the vehicle speed signal U or the input signal is higher than the boundary voltage, whose boundary value is based on a given voltage determined by the value of the voltage V2 at the connection e, while the gain increases when the voltage of the vehicle speed signal U is lower than said boundary voltage. The boundary voltage may be suitably selected by changing the value of the set-up voltage Vcc.

Thus, it is possible to obtain the reference wheel speed signal $U_R$, as an output signal, corresponding to a signal wherein the slip rate having a relatively small value when the value of the vehicle speed signal U is large at the output terminal h whereas it has a relatively large value when the value of the vehicle speed signal U is small, is added to the vehicle speed signal U.

Figure 3A:
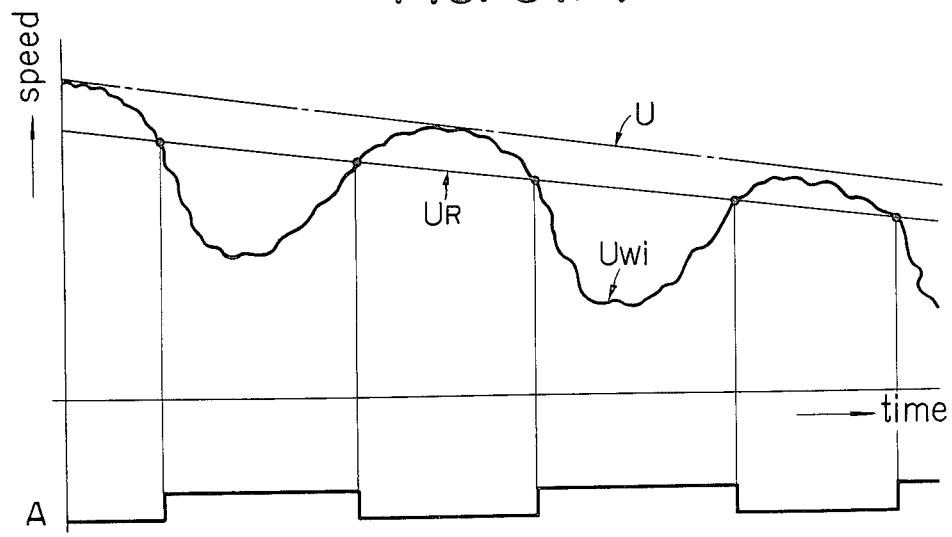
FIG. 3A shows various signal waveforms when the value of the vehicle speed signal is large.
Figure 3B:
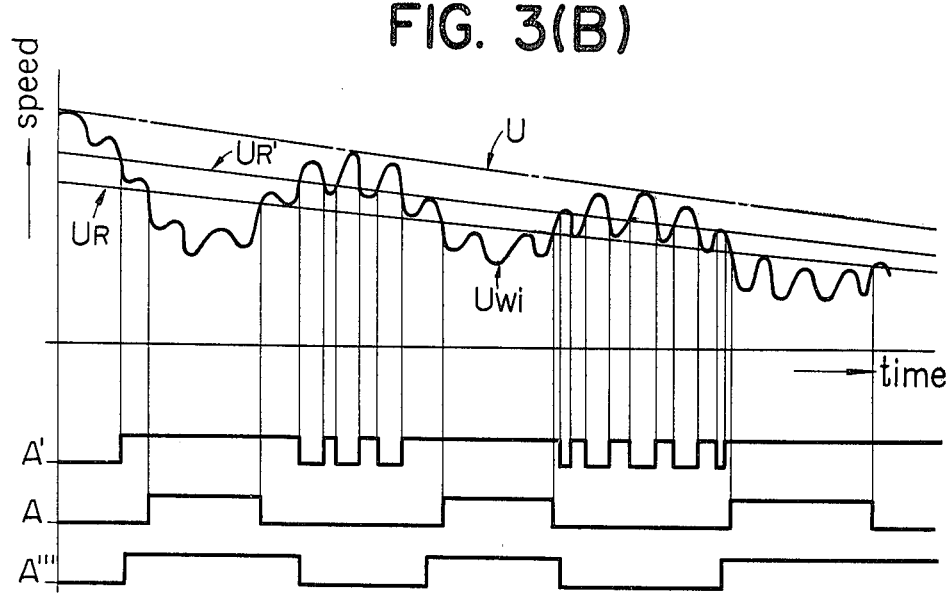
FIG. 3B shows various signal waveforms when the value of the vehicle speed signal is small.
Figure 4:
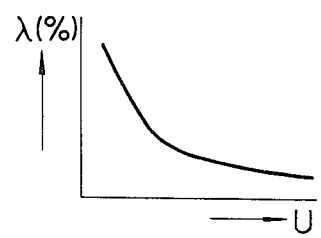
FIG. 4 is a graphic representation showing one form of change in the slip rate of the wheel in the case in which the slip rate of the wheel is set up so as to be varied continuously according to the value of the vehicle speed signal.

FIGS. 3A and 3B schematically illustrate forms of signals which change with time at the braking of wheels, the signals including the vehicle speed signal U, the wheel speed signal Uwi, the reference wheel speed signal $U_R$ or UR' which is the output signal of the reference wheel speed signal setting device 2, and the output signals A, A' or A" of the comparator 5. FIG. 3A shows the state where the value of the vehicle speed signal, immediately after commencement of the braking, is relatively large and FIG. 3B shows the state where the value of the vehicle speed signal some time after commencement of the braking is relatively small.

In FIG. 3A, the waveforms of the wheel speed signal Uwi include waveforms of relatively large amplitude as a result of action of the antiskid brake device and fine-oscillating waveforms of relatively small amplitude. However, for the reason that since the vehicle speed is high, the rotational motion of the wheels remains relatively stabilized giving rise to a reduced amount of fine variation in the rotation of the wheels due to irregular road surfaces, and there is a large difference between the value of the vehicle speed signal U and the value of the reference wheel speed signal $U_R$ and the rate of amplitude of waveform of the wheel speed signal due to the signal noise to amplitude of waveform based on the action of the antiskid brake device is relatively small, the comparator 5 can, when the wheel speed signal Uwi is compared with the reference wheel speed signal $U_R$, make comparison and logical operation while discriminating the waveforms of relatively large amplitude as a result of action of the antiskid brake device among the waveforms of the wheel speed signal Uwi, as a consequence of which it is possible to produce an output signal such as signal A.

In FIG. 3B, since the vehicle speed is relatively low, the rotational motion of wheels tends to be fine-varied due to irregular road surface and in converting the wheel speed signal from the pulse signal into the analog signal, a residual ripple becomes large in view of the filter characteristic as the frequency of the pulse signal decreases: since the slip rate of the wheel is always set to a given value irrespective of the vehicle speed U, the difference between the value of the vehicle speed signal U and the value of the reference wheel speed signal $U_R$, is reduced, and the rate of the amplitude of the waveform due to the signal noise to the amplitude of waveform of the wheel speed signal Uwi based on the action of the antiskid brake device becomes relatively large, the comparator 5 cannot clearly discriminate the waveform based on the action of the antiskid brake device among the waveforms of the wheel speed signal Uwi from the waveform due to the signal noise. Consequently, there is produced an output signal such as signal A' which contains noise. Consequently, the antiskid brake device will malfunction and the operational sense of the brake device at braking is adversely affected resulting in lowering of the braking efficiency and leading to an extremely dangerous condition as the case may be.

However, in the reference wheel speed signal setting device 2 in accordance with the present invention, when the value of the vehicle speed signal U is small as shown in FIG. 3B, the slip rate of the wheel of a value larger than the value of the slip rate $\lambda$ of the wheel which is taken when the value of the vehicle speed signal U is large as shown in FIG. 3A is added to the vehicle speed signal U, and hence, the actual value of the reference wheel speed signal $U_R$ becomes smaller than the value of the reference wheel speed signal $U_R'$ which is set assuming that the slip rate of the wheel is always set to a given value irrespective of the vehicle speed U. Thus, the comparator 5 can definitely discriminate the waveform based on the action of the antiskid brake device among the waveforms of the wheel speed signal Uwi from the waveform due to signal noise, as a consequence of which it is possible to produce an output signal such as signal A as shwon in FIG. 3B. In FIG. 3B, as compared with an ideal signal A" for the maximized braking efficiency, the signal A is somewhat late in the pulse front and is somewhat early in dissipation of the period of the pulse. However, since the signal A contains no signal noise, it is possible to prevent malfunction of the antiskid brake device and deterioration of the operational sense of the brake device at braking while restricting the lowering of the braking efficiency within the allowable limit.

While in FIGS. 2 and 3A and 3B, there are shown specific embodiments of the reference wheel speed signal setting device 2 and its operational example in which the slip rate $\lambda$ is set to be changed stepwise according to the value of the vehicle speed signal U and then added to the vehicle speed signal U thereby to obtain the reference wheel speed signal $U_R$, it will be understood that the reference wheel speed signal setting device 2 may also be constructed so that instead of setting the slip rate $\lambda$ to be changed stepwise according to the value of the vehicle speed U as mentioned above, the slip rate $\lambda$ is added to the vehicle speed signal U, while continuously changing the slip rate in a manner such that the larger the value of the vehicle speed signal U, the smaller will be the slip rate, and the smaller the value of the vehicle speed signal U, the larger will be the slip rate according to the value of the vehicle speed signal U, thereby setting the reference wheel speed signal $U_R$. In this case, it is possible to further increase the braking efficiency through the fine setting of the slip rate of the wheel.

As described above, in accordance with the present invention, the antiskid brake device includes a reference wheel speed signal setting device which sets the slip rate of the wheel so as to have a relatively small value when the value of the vehicle speed signal is large and to have a relatively large value when the value of the vehicle speed signal is small, the thus set slip rate of the wheel being added to the vehicle speed signal thereby setting the reference wheel speed signal, and therefore it is possible to provide an antiskid brake device which does not malfunction due to signal noise even if the latter is contained within the wheel speed signal and which does not adversely affect the operational sense of the braking device at braking, while keeping the reduction of the braking effect within the allowable range.

What is claimed is:

1. An antiskid brake device for use with wheeled vehicles comprising a wheel speed detector detecting the peripheral speed of a wheel in the form of a wheel speed signal (Uwi), a vehicle speed detector detecting the speed of a vehicle in the form of a vehicle speed signal (U), means for setting a reference wheel speed signal ($U_R$) for comparison with said wheel speed signal (Uwi) on the basis of said vehicle speed signal (U), and comparator means for comparing said wheel speed signal (Uwi) with said reference wheel speed signal ($U_R$) for controlling brake torque applied to the wheel during braking, said means for setting the reference wheel speed signal ($U_R$) comprising an input section for receiving, as an input signal, said vehicle speed signal (U) from said vehicle speed detector, a logical operation section for setting a slip rate ($\lambda$) of the wheel such that the slip rate is lower when said vehicle speed signal (U) is larger than a prescribed value than when said vehicle speed signal (U) is less than said prescribed value, said logical operation section including means for adding said slip rate ($\lambda$) to said vehicle speed signal (U) for determination of said reference wheel speed signal ($U_R$), and an output section for delivering, as an output signal, said reference wheel speed signal ($U_R$) as determined by said logical operation section.

2. An antiskid brake device as claimed in claim 1 wherein said logical operation section of said reference wheel speed signal setting means comprises an operational amplifier receiving said vehicle speed signal (U) as an input signal, division circuits for dividing the value of the output signal of said operational amplifier in a given ratio, and gain control circuits for changing the gain of said operational amplifier according to the magnitude of the value of said vehicle speed signal (U).

3. An antiskid brake device as claimed in claim 2 wherein said division circuits comprise resistors.

4. An antiskid brake device as claimed in claim 2 wherein said gain control circuits comprise resistors and a diode.

5. An antiskid brake device as claimed in claim 4 wherein said gain control circuits are connected in feedback relation to the operational amplifier.

6. An antiskid brake device as claimed in claim 1 wherein said slip rate ($\lambda$) is varied in a stepwise fashion in accordance with change in value of said vehicle speed signal (U).

7. An antiskid brake device as claimed in claim 1 wherein said slip rate ($\lambda$) is varied continuously in inverse proportion to the value of said vehicle speed signal (U).

* * * * *